United States Patent

Skinner

[19]

[11] Patent Number: 5,964,354

[45] Date of Patent: Oct. 12, 1999

[54] GARMENT SORTER

[76] Inventor: Karl R. Skinner, 317 S. Oklahoma Ave., Cherokee, Okla. 73728

[21] Appl. No.: 08/829,318

[22] Filed: Mar. 31, 1997

[51] Int. Cl.$^6$ ....................................................... B07C 5/02
[52] U.S. Cl. .......................... 209/3.3; 209/583; 198/465.4
[58] Field of Search .................................... 209/3.3, 44.1, 209/546, 555, 577, 583, 587, 588

[56] References Cited

U.S. PATENT DOCUMENTS

| | | |
|---|---|---|
| 5,058,750 | 10/1991 | Graese . |
| 5,072,822 | 12/1991 | Smith . |
| 5,193,686 | 3/1993 | Speckhart et al. . |
| 5,238,116 | 8/1993 | Santicchi . |
| 5,441,158 | 8/1995 | Skinner . |

*Primary Examiner*—William E. Terrell
*Assistant Examiner*—Gene O. Crawford
*Attorney, Agent, or Firm*—James E. Bradley

[57] ABSTRACT

A garment sorting apparatus has a screw conveyor, a flexible chain, a steel frame and a garment identifier. The screw conveyor supplies hanger-supported shirts and pants to the chain which moves the garments to sorting and receiving stations. Each shirt and pant has a visibly coded label which provides customer and routing information. The garment identifier has two visual readers, one above the other, which provide information read from the labels to a computer. The readers may comprise conventional optical character recognition devices or digital bar code scanners, depending upon the code contained in the labels. The garment identifier also comprises two sensors for determining the presence and type of garment on the screw conveyor. If the garment is a shirt, the first sensor signals the computer to prepare the upper reader. If the garment is a pant, the computer prepares the lower reader. A stabilizer restrains swinging motion while the garment is in the field of view.

13 Claims, 3 Drawing Sheets

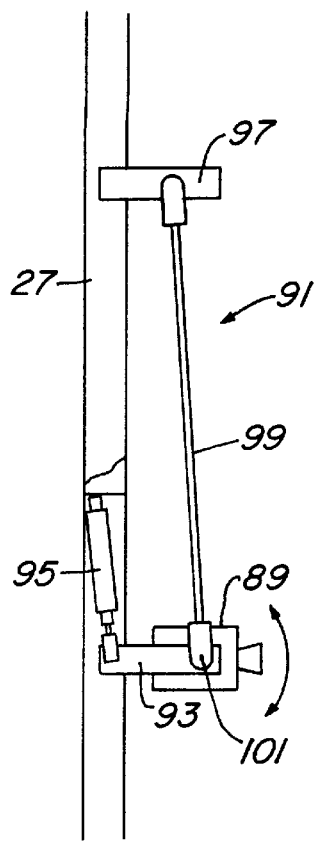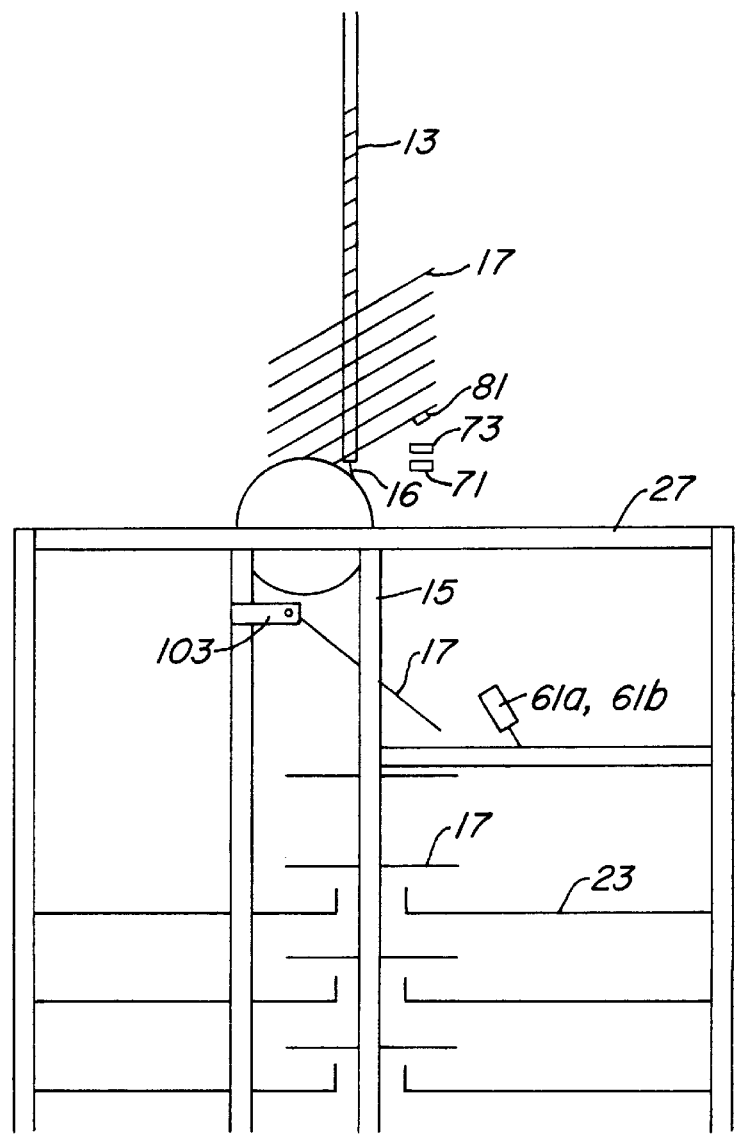

even though 5,964,354

GARMENT SORTER

TECHNICAL FIELD

This invention relates in general to garment sorters and in particular to an optical character recognition garment sorter.

BACKGROUND ART

Commercial uniform rental laundering facilities handle numerous garments or articles of clothing and must be able to sort the garments once they have been washed and are ready to be delivered to the customer. Typically, commercial facilities are required to label and sort the garments by delivery route, customer and man. The majority of laundries sort the laundry by hand. Automatic sorting machines are available for sorting garments which reduce the amount of manpower required. Sorting machines used for this purpose usually consist of a conveyor upon which hanger-supported garments are transferred. The conveyor carries the garments to various sorting stations along the path of the conveyor. Each garment has a bar coded label which is detected or scanned by a detector. The code information is then conveyed to a computerized processor which controls automated means for sorting the garment. Automated means for removing the articles from the conveyor are provided at each station. Using a bar code scanner, an operator is required to manually scan the label for each garment into a computer. The code allows each article to be tracked by the computer as the article is moved along the conveyor so the computer can control the automated means for removing the articles when the article passes the appropriate sorting station. Codes have also been programmed into radio frequency electronic chips which are then sewn into the garments. This concept is workable, but the chips are more expensive than labels.

Due to the large volume of garments that are sorted, the task of reading and identifying the articles becomes quite repetitious and time-consuming. A human operator is often slower in scanning the labels with a bar code scanner than the optimum speed of the conveyor. What is needed is an automated reading and sorting system wherein a large number of articles can be automatically identified and separated.

DISCLOSURE OF INVENTION

A garment sorting apparatus has a screw conveyor, a flexible chain, and a steel frame. The screw conveyor supplies hanger-supported garments to the chain. Attachment members are spaced apart along the length of the chain to move garments past a plurality of sorting and receiving stations. When actuated, the members will transfer the garment to a designated sorting station.

The hangers define an open triangular space and have a hook on an upper side. The hangers support both shirts and pants. Each shirt has a label on an inner portion of the collar, while each pants has a label on an outer waistband portion. The labels are visibly coded to provide customer and routing information.

The sorting conveyor has an automated garment identifier comprising visual readers which provide information read from the labels to a computer. The readers and illuminating lights are mounted to the frame, and each has an exclusive field of view, with one set being located above the other. The readers may comprise conventional optical character recognition devices or digital bar code scanners, depending upon the code contained in the labels.

The garment identifier also comprises two sensors for determining the presence and type of garment on the screw conveyor. The first sensor is a typing sensor and works with a reflector. This sensor emits and receives a reflected light beam through the open portion of the hangers when the garment is a pant. When the beam is 510 interrupted, a shirt is present, and the sensor sends a signal to the computer accordingly to designate which reader is to be used. The second sensor is a motion sensor located adjacent to the first sensor. The motion sensor detects the movement of a garment past the sensor and sends a signal to the computer to direct the designated reader to capture an image.

The garments will be conventionally conveyed to the screw conveyor where they move along toward the garment identifier. If the garment is a shirt, the sensor signals the computer, which then signals the upper reader to prepare to read the label on a shirt. If the garment is a pant, the computer signals the lower reader to prepare to read the label on the pant. Alternatively, if the labels are bar coded and the readers are bar code scanners, the readers will be pivoted by a linkage in order to read labels.

After the first sensor types the garment, the garment is detected by the second sensor which actuates the appropriate reader to read the label. The garment drops off the end of the screw conveyor and is carried away by an attachment member on the chain. The garment then proceeds down the chain toward the sorting stations where it is removed and collected at a receiving station.

BRIEF DESCRIPTION OF DRAWINGS

FIG. 5 is a side view of an alternate embodiment of the invention.

FIG. 6 is a top view of an alternate embodiment of the invention.

BEST MODE FOR CARRYING OUT THE INVENTION

Figure 1:
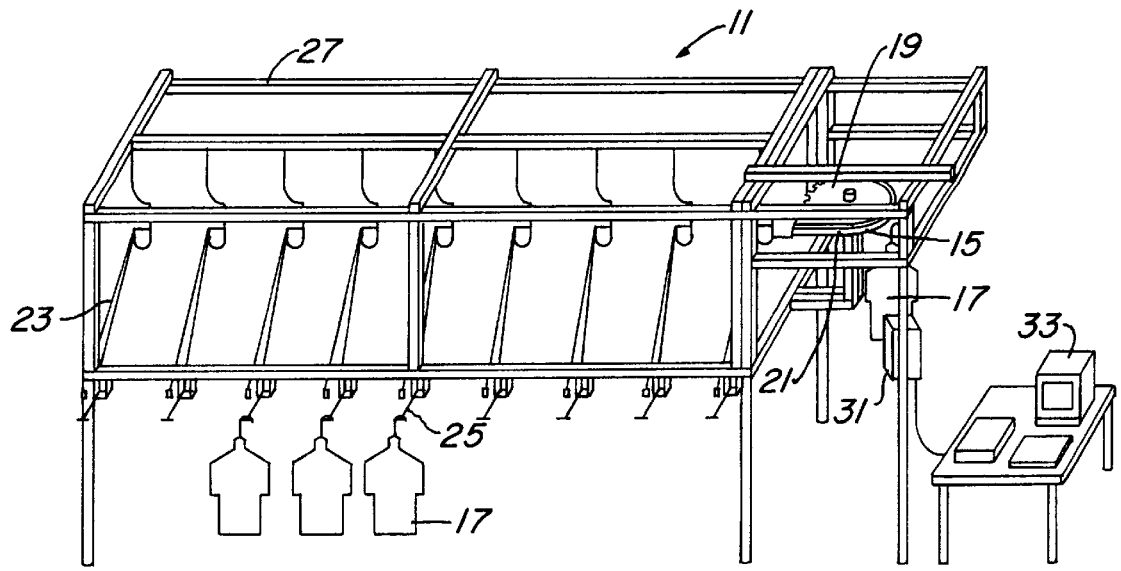
FIG. 1 is a schematic view of a garment sorting apparatus constructed in accordance with the invention.
Figure 2:
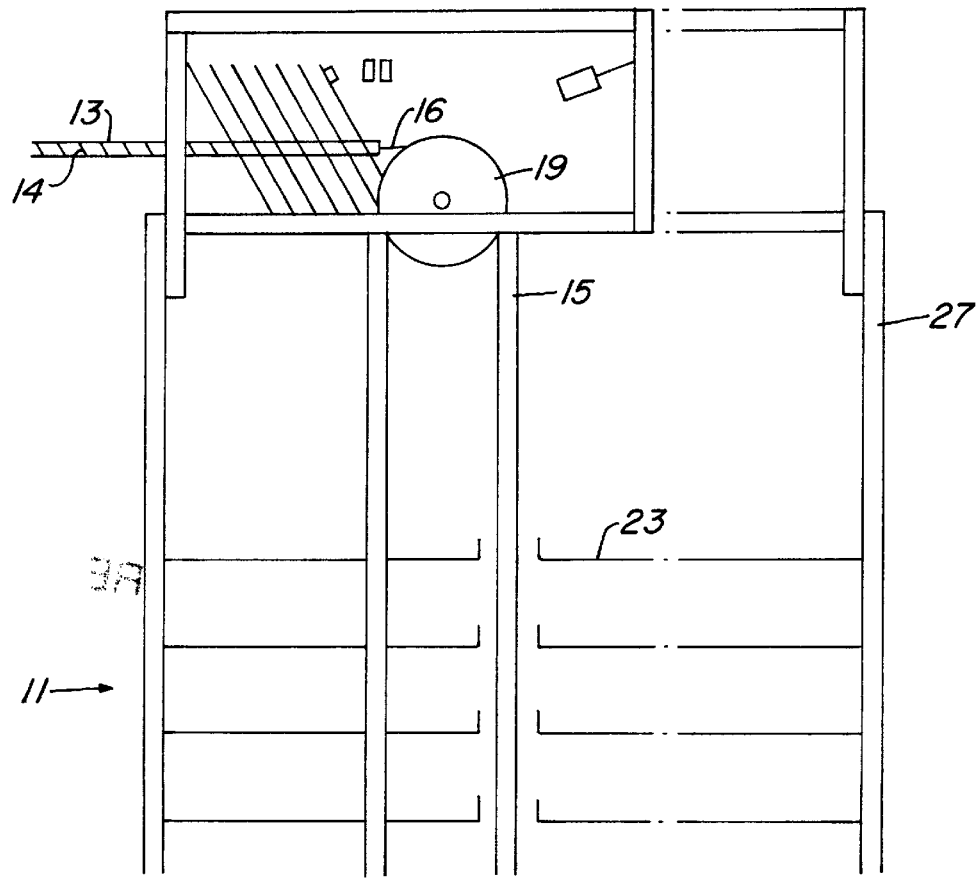
FIG. 2 is a top view of the apparatus of FIG. 1.

Referring to FIGS. 1 and 2, garment sorting apparatus 11 has a transport or screw conveyor 13, a flexible linkage or chain 15, and a stationary steel frame 27 for supporting the components. Screw conveyor 13 is a conventional worm-drive shaft with a helical groove 14 which receives the hook ends of wire clothes hangers. Screw conveyor 13 supplies hanger-supported garments 17 to chain 15. A slide rod 16 located at the end of screw conveyor 13 facilitates the transfer of garments 17 from screw conveyor 13 to chain 15. Chain 15 is driven by a drive means 19 such as a motor-driven wheel or a sprocket. A series of attachment members 21 are spaced apart at regular intervals along the length of chain 15. Chain 15 and attachment members 21 move garments along a conveyor path past a plurality of sorting stations 23 and receiving stations 25. When actuated, members 21 transfer the hanger of a garment to a designated sorting station 23.

Figure 3:
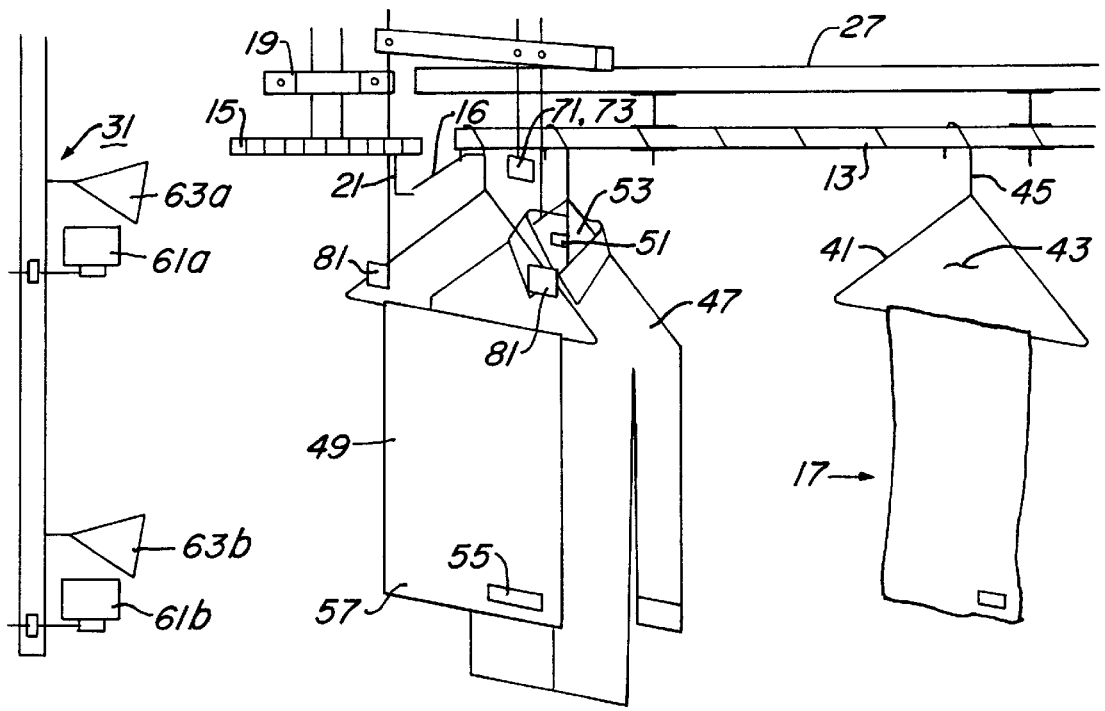
FIG. 3 is a perspective view of a reader portion of the apparatus of FIG. 1.

Referring to FIG. 3, garments 17 are supported on wire clothes hangers 41 which define an open triangular space 43 and have a hook 45 on an upper side. Hangers 41 support both shirts 47 and pants 49. Each shirt 47 has a tag or label 51 affixed to an inner portion of the collar 53, while each pants 49 has a label 55 affixed to an outer waistband portion 57. Labels 51, 55 are visibly coded with either arabic numerals only or a digital bar code plus arabic numerals. The codes provide customer and routing information. In the preferred embodiment, labels 51, 55 also have fiducial symbols which help increase their readability. The fiducial symbols comprise a small dot on one end and a larger dot on the other end.

Sorting conveyor 11 has an automated garment identifier 31 which provides information read from labels 51, 55 to a computer 33. The primary elements of garment identifier 31 are visual readers 61a and 61b. Readers 61a, 61b are independently mounted to frame 27 and each has an exclusive field of view. Reader 61a and its field of view is located above reader 61b and its field of view. Readers 61a, 61b read codes on labels 51, 55, respectively, and provide computer 33 with that information. A pair of light sources 63a and 63b are located adjacent to readers 61a, 61b, respectively, for enhancing the ability of readers 61a, 61b to read labels 51, 55. Readers 61a, 61b and lights 63a, 63b are secured to a vertical member of frame 27.

Readers 61a, 61b may comprise either optical character recognition devices or conventional digital bar code scanners, depending upon the code contained in labels 51, 55. A number of manufacturers produce optical character recognition devices comprising video cameras and software. One acceptable software for use with commercially available video cameras is "Image Analyst" from Acuity Imaging, Inc., Nashua, N.H. Optical character recognition is programmed to first detect a label in a field of view, then to read the label. The fiducial symbols may assist in this process, particularly if the label is misaligned when it is affixed to the garment.

In order for bar code scanners to read bar code, the scanners must be moved across the code. One embodiment for performing this operation is shown in FIG. 5. A bar code scanner 89 is pivoted through a field of view with a mechanical linkage 91. Scanner 89 is secured to one end of a lower brace 93. A lower end of a hydraulic or pneumatic piston 95 is attached to the other end of brace 93 while the upper end of piston 95 is attached to frame 27. An upper brace 97 is located above brace 93 and piston 95 and is stationarily attached to frame 27 on one end. An arm 99 extends between the other end of brace 97 and a pivot point 101 on brace 93. When piston 95 is actuated, the end of brace 93 is forced downward thereby pivoting scanner 89 vertically about point 101 in order to scan a label.

Figure 4:
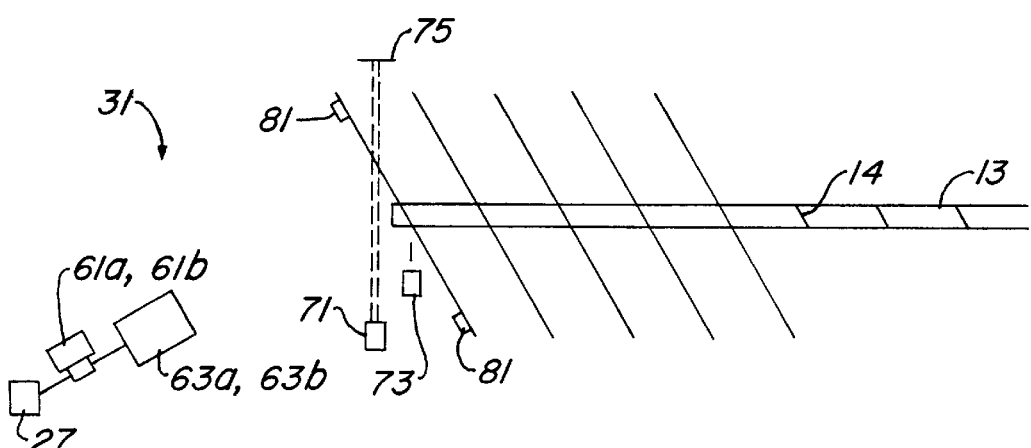
FIG. 4 is a top view of the reader portion of FIG. 3.

Referring to FIGS. 3 and 4, garment identifier 31 also comprises two sensors for determining the presence and type of garment on screw conveyor 13. The first sensor is an infrared typing sensor 73. Typing sensor 73 is located adjacent to and below screw conveyor 13. Typing sensor 73 is emits a broad beam through the open portion 43 of hanger 41 when a pant 49 is supported by hanger 41. When a shirt 47 is supported on hanger 41, sensor 73 will detect that open portion 43 is covered by shirt 47. Sensor 73 sends a corresponding signal to computer 33 indicating which type of garment is present.

The second sensor is a motion sensor 71 which is located adjacent to and slightly downstream from typing sensor 73. Motion sensor 71 detects the presence of hooks 45 on hangers 41 every time a hanger 41 moves past sensor 71. Motion sensor 71 works in conjunction with a reflector 75 to emit and receive a narrow infrared light beam. When the beam of motion sensor 71 is interrupted, it sends a signal to computer 33.

A pair of magnetic stabilizers 81 are also utilized by garment identifier 31. Stabilizers 81 extend downward from frame 27 on rods and are located along the inclined wire sides of each hanger 41 as it moves to the end of screw conveyor 13. Stabilizers 81 magnetically attract the sides of steel hangers 41 to minimize lateral swaying or swinging motion of garments 17 when labels 51, 55 are being read by readers 61a, 61b. Stabilizer 81 momentarily holds each garment 17 stationary.

In operation, garments 17 will be conventionally conveyed to screw conveyor 13 where they move along toward garment identifier 31. If garment 17 is a shirt 47, open space 43 of hanger 41 is covered, thereby triggering sensor 73 to signal computer 33, which then signals reader 61a to prepare to read label 51 on shirt 47. If garment 17 is a pant 49, open space 43 of hanger 41 is uncovered and computer 33 automatically signals reader 61b to prepare to read label 55 on pant 49. Computer 33 simultaneously activates the corresponding light 63a or 63b for readers 61a, 61b, respectively. Alternatively, if labels 51, 55 are bar coded and readers 61a, 61b are bar code scanners, readers 61a, 61b will be pivoted by linkage 91 in order to read labels 51, 55.

After sensor 73 types garment 17 but just before sensor 71 detects the presence of garment 17, garment 17 contacts and is steadied by stabilizers 81. Stabilizers 81 do not impede the axial motion of garment 17 along screw conveyor 13. The garment is then detected by sensor 71 which sends a signal to computer 33. Computer 33 then actuates the appropriate reader 61a, 61b to read the label 51, 55, respectively, in a field of view.

Immediately after the label on garment 17 has been read, hook 45 of garment 17 drops off the end of screw conveyor 13, disengages stabilizers 81, and slides down slide rod 16. The movement of garment 17 is synchronized with chain 15 so that hook 45 is picked up and carried away by an attachment member 21 on chain 15. Chain 15 moves garment 17 out of the way by immediately making a right turn so that the fields of view will be clear for the next garment 17. Garment 17 then proceeds down chain 15 toward sorting stations 23 where garments 17 are removed from attachment members 21 by a mechanical linkage (not shown) and collected at receiving stations 25.

Referring to FIG. 6, an alternate embodiment is shown. Screw conveyor 13 may be positioned parallel to chain 15 if desired. In this configuration, garments 17 feed directly into the conveyor path of chain 15, rather than making a right turn. A slide rod 16 is employed as described above. The components of garment identifier 31 are relocated within an outer perimeter of frame 27. As garments 17 transition from screw conveyor 13 and initially move along chain 15, the outer left edge of each garment 17 makes contact with and is rotationally pivoted clockwise by a stationary arm 103. Arm 103 is provided so that the fields of view of readers 61a, 61b are unobstructed by a previously read garment 17.

The invention has several advantages. This sorting apparatus can automatically and accurately handle numerous garments with minimal human intervention. An operator is not required to manually scan the label for each garment. The apparatus and labels may be configured with either optical character recognition or bar code capability. This system also has lower operating costs than those systems which utilize electronic chips for coding the garments.

While the invention has been shown in only two of its forms, it should be apparent to those skilled in the art that it is not so limited, but is susceptible to various changes without departing from the scope of the invention. For example, different types of sorting machines may be employed.

I claim:

1. In a laundry sorting system having a conveyor which receives hooks of hangers that support garments, an identifier assembly for identifying the garments, comprising:

a tag adapted to be secured to each garment, the tag having a visible code thereon which identifies the garment;

at least one visual reader mounted adjacent to the conveyor for reading the code on the tag on each garment when the tag is in a field of view while the garment is moving along the conveyor and supplying information determined from the code to a computer;

a stabilizer mounted adjacent to and below the conveyor for engaging a portion of each hanger below the hook to reduce swinging movement of the garments on the conveyor when the tag is in the field of view, the stabilizer enhancing the ability of the reader to detect the tags, read the code and convey the information to the computer; wherein the code comprises a digital bar code; wherein the reader is a digital bar code scanner; and wherein the laundry sorting system further comprises further comprises means for pivoting the bar code scanner about a pivot axis to scan the digital bar code when the tag is in the field of view.

2. The laundry sorting system of claim 1, wherein said at least one visual reader comprises two of the visual readers, one of the readers being located above the other of the readers and having a field of view located above the field of view of the other of the readers.

3. The laundry sorting system of claim 1 wherein a portion of the stabilizer is magnetic for attracting hangers carrying the garments.

4. The laundry sorting system of claim 1, further comprising means for detecting when the tag is in the field of view and signalling the reader.

5. In a laundry sorting system having a conveyor which receives hooks of hangers that support garments an identifier assembly for identifying the garments, comprising:

a tag adapted to be secured to each garment, the tag having a visible code thereon which identifies the garment;

at least one visual reader mounted adjacent to the conveyor for reading the code on the tag on each garment when the tag is in a field of view while the garment is moving along the conveyor and supplying information determined from the code to a computer;

a stabilizer mounted adjacent to and below the conveyor for engaging a portion of each hanger below the hook to reduce swinging movement of the garments on the conveyor when the tag is in the field of view, the stabilizer enhancing the ability of the reader to detect the tags, read the code and convey the information to the computer; wherein the garments are shirts and pants; and wherein the tag adapted to be secured to the pants will be at a lower elevation than the tag adapted to be secured to the shirts while being carried by the conveyor, creating a lower field of view for the pants and an upper field of view for the shirts; and wherein said at least one visual reader comprises:

two of the visual readers, one of the readers being located above the other of the readers for reading tags in the upper field of view, the other of the readers reading tags in the lower field of view; and wherein the identifier assembly further comprises:

means for detecting which field of view the tag is located in and for controlling an appropriate one of the readers to read the tag.

6. The laundry sorting system of claim 5 wherein the code comprises arabic numerals; and wherein the reader is an optical character recognition device.

7. The laundry sorting system of claim 5 wherein the code comprises a digital bar code; and wherein the reader is a digital bar code scanner.

8. In a laundry sorting system having a conveyor which receives hooks of hangers which support and convey shirts and pants, the laundry sorting system being controlled by a computer to sort the shirts and pants into various collection stations, the hangers having a frame which forms a perimeter of a generally triangular open space, the space being obscured when carrying a shirt and exposed when carrying pants, the shirts and pants each having a tag with an identifying visible code thereon, an identifier assembly for identifying the shirts and pants, comprising:

a first reader mounted adjacent to the conveyor for reading the code on the tag on each shirt when the tag is in an upper field of view while the shirt is moving along the conveyor and for supplying information determined from the code to the computer;

a second reader mounted adjacent to the conveyor for reading the code on the tag on each pants when the tag is in a lower field of view while the pants is moving along the conveyor and for supplying information determined from the code to the computer, the first reader being located above the second reader; and an optical sensor mounted adjacent to the conveyor with a viewing field that contains the hangers as the hangers move along the conveyor for detecting whether the open space of the hanger is obscured or exposed to indicate whether the hanger is carrying a shirt or a pants, and for providing a signal to the appropriate reader to read the code on the tag; wherein the code comprises a digital bar code;

the readers are digital bar code scanners; and the laundry system further comprises:

means for pivoting each of the bar code scanners about a pivot axis when one of the tags is in one of the fields of view.

9. The laundry system of claim 8, further comprising a magnetic stabilizer mounted below the conveyor for attracting hangers carrying the shirts and pants to prevent swaying on the conveyor while the shirts and pants are in the fields of view.

10. An apparatus for sorting hanger-supported shirts and pants, each of the hangers having a frame which forms a perimeter of a generally triangular open space below a hook, the open space being obscured when carrying a shirt and exposed when carrying a pants, a conveyor which supports hooks of hangers and conveys hangers holding shirts and pants;

a label with arabic numerals thereon secured to and identifying each of the shirts and pants, the labels being positioned such that when a shirt is on a hanger, the label will be within a shirt field of view, and when a pants is on a hanger, the label will be within a pants field of view;

a computer which controls the apparatus to deliver the shirts and pants to selected collection stations;

a shirt optical character reader for reading the numerals on the labels on the shirts and conveying information from the numerals to the computer, the shirt reader being mounted adjacent to the conveyor for observing the shirt field of view;

a pants optical character reader for reading the numerals on the labels on the pants and conveying information from the numerals to the computer, the pants reader being spaced below the shirt reader and observing the pants field of view;

a first sensor comprising a light beam and a circuit mounted adjacent to the conveyor with the light beam pointed towards the open spaces of the hangers as the hangers pass by on the conveyor for detecting whether the hanger has a shirt or pants by detecting whether or not the light beam is being interrupted, the first sensor emitting a first sensor signal to inform an appropriate one of the readers to prepare to take a reading; and a second sensor mounted adjacent to the conveyor for detecting the presence of the hangers as they move along the transport conveyor, the second sensor emitting a second sensor signal to inform the readers when the hanger is entering one of the fields of view, the appropriate one of the readers being operable in response to both of the sensor signals.

11. The apparatus of claim 10, further comprising a magnet mounted adjacent to and below the conveyor for attracting hangers to reduce swinging motion of the shirts and pants on the conveyor while the readers read the labels.

12. The apparatus according to claim 10, further comprising means for turning the shirts and pants immediately after each of the labels has been read so as to avoid obstructing the view of the next shirt and pants.

13. A method for identifying hanger-supported garments carried by a conveyor, comprising:

mounting a visual reader adjacent to the conveyor and facing the reader toward a field of view;

positioning a stabilizer below and adjacent to the conveyor;

securing a tag to each garment, the tag having a visible code which identifies the garment;

stabilizing each garment with the stabilizer to reduce swinging movement of the garment while the tag is in the field of view and the conveyor continues to advance the garment for enhancing the ability of the reader to detect the tag and read the code;

reading the code on the tag on each garment with the visual reader when the tag is in the field of view;

conveying the read information to a computer; wherein the step of securing a tag to each garment comprises providing a digital bar code on the tag; and wherein the step of reading the code on the tag on each garment with a visual reader comprises utilizing a digital bar code scanner; and wherein the step of reading the tag on each garment with a digital bar code scanner further comprises pivoting the bar code scanner about a pivot axis when one of the tags is in the field of view.

* * * * *